G. G. Carver,
Flour Sieve.
Nº 54,857. Patented May 22, 1866.
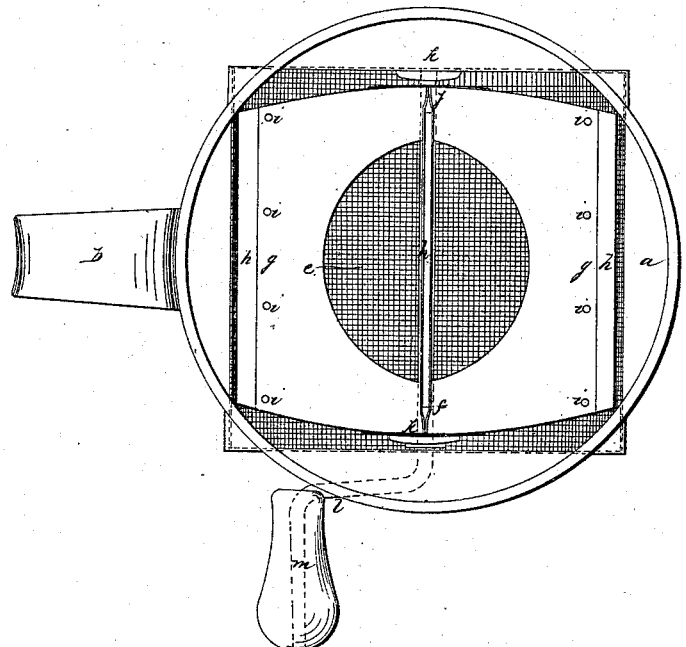
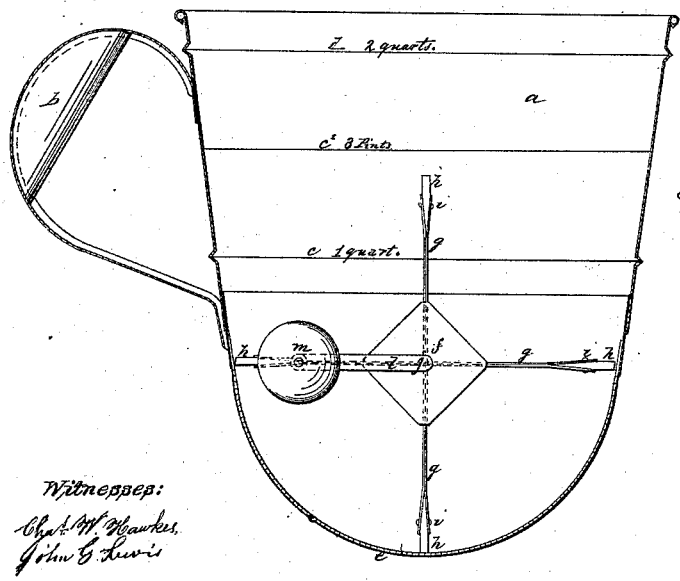
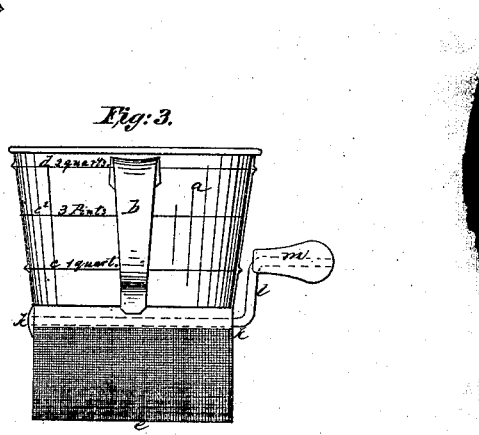
Witnesses:
Chas. W. Hawkes,
John E. Lewis
Inventor:
George G. Carver

UNITED STATES PATENT OFFICE.

GEORGE G. CARVER, OF ROXBURY, MASSACHUSETTS.

IMPROVED FLOUR DIPPER, MEASURER, AND SIFTER.

Specification forming part of Letters Patent No. 54,857, dated May 22, 1866.

*To all whom it may concern:*

Be it known that I, GEO. G. CARVER, of Roxbury, in the county of Norfolk and Commonwealth of Massachusetts, have invented a new and useful Improvement on a Machine or Instrument for Dipping, Measuring, and Sifting Flour and other Articles; and I do hereby declare that the following is a full, clear, and exact description of the construction and operation of the same, reference being had to the accompanying drawings, making a part of this specification, and to the letters of reference marked thereon, in which—

Figure 1 is a plan. Fig. 2 is a vertical transverse section, and Fig. 3 is a front view diminished one-half.

In the drawings, $a$ represents the dipper; $b$, the handle of the dipper; $c$, the line indicating one quart by measure; $c^2$, the line indicating three pints; $d$, the line indicating two quarts; $e$, the wire-netting; $f$, the fan-wheel; $g$, the fans; $h$, the felting; $i$, the rivets; $j$, the shaft running through the center of the fan-wheel; $k$, the journals; $l$, the crank, and $m$ the handle on the crank.

The dipper $a$ is constructed of a suitable size and form to make it convenient for dipping flour from a barrel, with a handle, $b$, fixed thereon, and creases or lines around it at different heights to indicate measurement. The line $c$ indicates one quart by measure. The line $c^2$ indicates three pints, and the line $d$ two quarts.

The bottom of this dipper is made in a semicircular form and covered with wire-netting $e$, suitable for a sieve. The interior of the dipper is provided with a fan-wheel, $f$, of a size corresponding to the circle of the bottom, and fitted to revolve therein in close proximity to the wire-netting. This fan-wheel $f$ has four fans, $g$, which are provided with a strip of felting, $h$, secured to the outer edge of each fan by rivets $i$. This felting is so adjusted as to press against the wire-netting as the wheel revolves.

The fan-wheel has a shaft, $j$, running through its center, with a journal, $k$, at each end. One of the journals extends through the side of the dipper, and has a crank, $l$, attached thereto, and on the outer end of the crank there is a handle, $m$, by which it is turned.

In order to sift two quarts of flour this dipper is taken by the handle and dipped into the flour and filled up to the line indicating two quarts. Then by turning the crank the fan-wheel revolves, causing the flour to pass freely through the sieve.

The beauty of this instrument is, it is so compact that it may always be kept in the flour-barrel as a dipper, measure, and sieve, all combined in one.

Having thus fully described the construction and operation of my improvements, I will now proceed to point out the parts which I claim as my invention and desire to secure by Letters Patent.

I claim—

The combination of the dipper, with ridges or lines indicating quarts and pints, the horizontal beater, with radial flexible rubbers, and concave sieve, all as specified.

GEORGE G. CARVER.

Witnesses:
CHAS. W. HAWKES,
JOHN G. LEWIS.